(12) United States Patent
Toyoda et al.

(10) Patent No.: US 6,663,533 B2
(45) Date of Patent: Dec. 16, 2003

(54) LOCK-UP CONTROL SYSTEM FOR TORQUE CONVERTER

(75) Inventors: Shinya Toyoda, Kawasaki (JP); Hironobu Waki, Kanagawa Pref. (JP)

(73) Assignee: Jatco Ltd, Fuji (JP)

(*) Notice: Subject to any disclaimer, the term of this patent is extended or adjusted under 35 U.S.C. 154(b) by 13 days.

(21) Appl. No.: 10/126,314

(22) Filed: Apr. 18, 2002

(65) Prior Publication Data

US 2002/0193202 A1 Dec. 19, 2002

(30) Foreign Application Priority Data

Apr. 23, 2001 (JP) ........................................ 2001-124017

(51) Int. Cl.[7] ............................................. F16H 61/14
(52) U.S. Cl. ........................ 477/62; 477/168; 477/174; 477/180
(58) Field of Search .................. 477/62, 168, 169, 477/174, 180, 77, 79, 118

(56) References Cited

U.S. PATENT DOCUMENTS

| | | |
|---|---|---|
| 5,616,099 A | 4/1997 | Sakai |
| 5,667,458 A | 9/1997 | Narita et al. |
| 5,935,043 A | 8/1999 | Watanabe et al. |

Primary Examiner—Charles A. Marmor
Assistant Examiner—Dennis Abdelnour
(74) Attorney, Agent, or Firm—Klarquist Sparkman, LLP

(57) ABSTRACT

A lock-up control system for a torque converter which includes a lock-up clutch engageable under control of an engaging capacity of the lock-up clutch to thereby lock up input and output elements of the torque converter. The control system is operative during coasting in a lock-up region requiring engagement of the lock-up clutch, so as to bring the engaging capacity of the lock-up clutch to a coast lockup capacity smaller than a lock-up capacity under a driving condition at the same vehicle speed. The control system is further operative when an engine braking range is selected during coasting in the lock-up region, so as to bring the engaging capacity of the lock-up clutch to a value greater than the coast lock-up capacity, preferably to a controlling maximum value.

7 Claims, 4 Drawing Sheets

LOCK-UP CONTROL SYSTEM FOR TORQUE CONVERTER

BACKGROUND OF THE INVENTION

1. Field of the Invention

The present invention relates to a lock-up control system for suitably achieving a direct coupling of input and output elements of a torque converter for a vehicle automatic transmission.

2. Description of Related Art

An automatic transmission, inclusive of a continuously variable transmission (CVT), is generally provided with a torque converter in the power train, for multiplying torque and/or absorbing torque fluctuations. A torque converter conducts power transmission between the input and output elements via an operating fluid, and thus suffers from relatively low transmission efficiency and unsatisfactory fuel consumption. In order to overcome these problems, it became customary to adopt a lock-up type torque converter wherein the input and output elements can be directly coupled by engaging a lock-up clutch in a traveling condition in which torque multiplying function and/or torque-fluctuation absorbing function are not required.

For achieving further improved fuel consumption, it is desirable to broaden a lock-up region by maintaining a torque converter in a lock-up state also during inertial traveling, or coasting, wherein an accelerator pedal is released and the throttle opening degree is maintained at, or near, zero, thereby allowing lock-up of the torque converter down to low load and low vehicle speed conditions. Thus, it is a recent trend that the torque converter is maintained in a lock-up state also during coasting. However, in order to avoid an engine stall when a brake pedal is depressed for sudden braking during coasting on a low friction road, it is desirable to quickly release the lock-up by disengaging the lock-up clutch.

In this connection, if the lock-up of a torque converter during coasting occurs by keeping an engaging capacity of a lock-up clutch at a controlling maximum value, as in the lock-up during a normal traveling, the delay in lock-up release based on the lock-up clutch disengagement is prolonged, thereby failing to avoid the engine stall problem upon wheel locking due to the delay of the lock-up release as a result of sudden braking.

To eliminate such a problem, a countermeasure has been proposed wherein the engaging capacity of a lock-up clutch during coasting in a lock-up region is maintained at a minimum coast lock-up capacity required for lock-up under a steady traveling condition, as disclosed in U.S. Pat. Nos. 5,667,458 and 5,616,099, the disclosures of which are herein incorporated by reference. With such a countermeasure, lock-up is conducted at an engaging capacity that is smaller than the controlling maximum value, so that the response to the lock-up releasing is correspondingly quickened, to thereby avoid the engine stall problem even upon wheel locking due to sudden braking.

Such a conventional coast lock-up control is highly effective insofar as coasting is continued in a drive (D) range where engine braking generally is ineffective. However, the following problems may be caused when engine braking is desired during coasting and a low (L) range is thus selected as an engine-braking range.

FIG. 4 is an operation time-chart showing the coast lock-up of a conventional lock-up control in the case of a changeover from the D range to the L range at a moment t1, during a coasting with the throttle valve opening TVO kept at 0/8 by releasing the accelerator pedal. It is assumed that an engaging capacity of a lock-up clutch, which is the differential pressure $(P_A-P_R)$ between an apply pressure $P_A$ and a release pressure $P_R$ of the lock-up clutch, is kept at the required minimum controlled value indicated by a solid line as described in the patent documents cited above. On this occasion, the demanded value of the lock-up clutch engaging capacity indicated by a broken line is suddenly increased after the moment t1 and exceeds the controlled value indicated by the solid line at a moment t2, since the engine braking torque is added to an inertia torque corresponding to the raised amount of an engine revolution speed $N_e$ due to the change-over to the L range.

The lock-up clutch engaging capacity thus tends to become insufficient relative to the demanded value after the moment t2, thereby resulting in undesirable disengagement of the lock-up clutch. Furthermore, once the lock-up clutch has been disengaged, the lock-up clutch cannot be reengaged unless the lock-up clutch engaging capacity is increased to a value higher than the demanded value. As can be noted from a decrease in the engine revolution speed $N_e$ after the moment t2 apart from a turbine revolution speed $N_t$ (torque converter output revolution speed), and also from the temporal transition of a vehicle deceleration, despite the changeover from the D range to L range, an expected magnitude of the vehicle deceleration cannot be obtained, or this may result in a situation wherein the vehicle deceleration is rather decreased.

Namely, in the conventional coast lock-up control, when the D range having an ineffective engine braking function is changed over to the L range as an engine-braking range due to a necessity for an engine-braking during coasting, there may arise such problems that the intended improving effect of the fuel efficiency is not fully achieved since the lock-up of the torque converter is released even in the lock-up region, and/or unnatural driving feel is caused due to unexpectedly low, or occasionally decreasing engine braking force upon the change-over.

SUMMARY OF THE INVENTION

It is a primary object of the present invention to provide an improved lock-up control system for a torque converter, capable of suitably conducting the engaging capacity control of a lock-up clutch upon changeover from a non-engine-braking range to an engine-braking range, to thereby avoid the above-mentioned problems of the prior art.

It is another object of the present invention to provide an improved lock-up control system for a torque converter, whereby an appropriate engaging capacity control of the lock-up clutch can be readily conducted.

According to a first aspect of the present invention, there is provided a lock-up control system for a torque converter including a lock-up clutch engageable under a control of an engaging capacity of the lock-up clutch to thereby lock up input and output elements of the torque converter, said lock-up control system being operative during coasting in a lock-up region requiring engagement of the lock-up clutch, for bringing the engaging capacity of the lock-up clutch to a coast lockup capacity smaller than a lock-up capacity under a driving condition at the same vehicle speed, said lock-up control system being further operative when an engine braking range is selected during the coasting in the lock-up region, for bringing the engaging capacity of the lock-up clutch to a value greater than the coast lock-up capacity.

According to a second aspect of the present invention, there is provided a lock-up control system for a torque converter of an automatic transmission, including a lock-up clutch engageable under control of an engaging capacity of the lock-up clutch to thereby lock up input and output elements of the torque converter, said automatic transmission including a range changeover means for effecting changeover between a non-engine-braking range and at least one engine-braking range, said lock-up control system comprising: a lock-up clutch control means being operative during coasting in a lock-up region requiring engagement of the lock-up clutch, for bringing the engaging capacity of the lock-up clutch to a coast lockup capacity smaller than a lock-up capacity under a driving condition at the same vehicle speed; said lock-up control means being further operative when it is judged that said range changeover means is operated in the lock-up region to effect changeover into an engine braking range, for bringing the engaging capacity of the lock-up clutch to a value greater than the coast lock-up capacity.

In the torque converter to which the lock-up control system according to the present invention is applied, the input and output elements of the lock-up clutch are directly coupled to each other in the lock-up region. Furthermore, during coasting in the lock-up region, the engaging capacity of the lock-up clutch is brought to a coast lockup capacity smaller than a lock-up capacity under a driving condition at the same vehicle speed.

With the control system according to the present invention, the engaging capacity of the lock-up clutch is increased to be greater than the coast lock-up capacity, upon selecting an engine braking condition during coasting in the lock-up region. Thus, even when the demanded value of the lock-up clutch engaging capacity is suddenly increased due to the inertia torque of the raised amount of input rotation associated with the range changeover and also due to an engine braking torque, it is possible to maintain sufficient lock-up clutch engaging capacity, thereby avoiding undesirable disengagement of the lock-up clutch.

Therefore, the present invention effectively eliminates such problems upon the range changeover into an engine braking range, such as the lock-up being released even in the lock-up region with the result that the intended effect of improved fuel efficiency is not fully achieved, and/or unnatural driving feel is caused due to unexpectedly low, or occasionally decreasing engine braking force upon the change-over even though an engine braking range has been selected.

With the control system according to the second aspect of the present invention, in particular, since the engaging capacity of the lock-up clutch can be detected highly accurately, further advantages can be achieved in that it is unnecessary to excessively increase the hydraulic pressure of the working fluid and it is thus possible to realize improved fuel consumption.

For positively avoiding an engine stall due to a delay in a lock-up releasing even in the case of a sudden braking, it is preferred that the control system during coasting in a lock-up region brings the engaging capacity of the lock-up clutch to a minimum coast lock-up capacity required for the lock-up under a steady traveling condition.

For bringing the engaging capacity of the lock-up clutch to a value greater than the coast lock-up capacity according to the present invention, it is preferred that the control system upon selection of the engine braking range during coasting in the lock-up region brings the engaging capacity of the lock-up clutch to a controlling maximum value. Such a design makes it possible to positively avoid disengagement of the lock-up clutch even when an engine-braking range is selected in any driving conditions, and to readily conduct an appropriate capacity control of the lock-up clutch according to the present invention, besides that the design itself is highly advantageous from the viewpoint of structural simplification and cost reduction.

BRIEF DESCRIPTION OF THE DRAWINGS

The present invention will be further explained below with reference to a preferred embodiment shown in the accompanying drawings.

DETAILED DESCRIPTION OF THE PREFERRED EMBODIMENT

Figure 1:
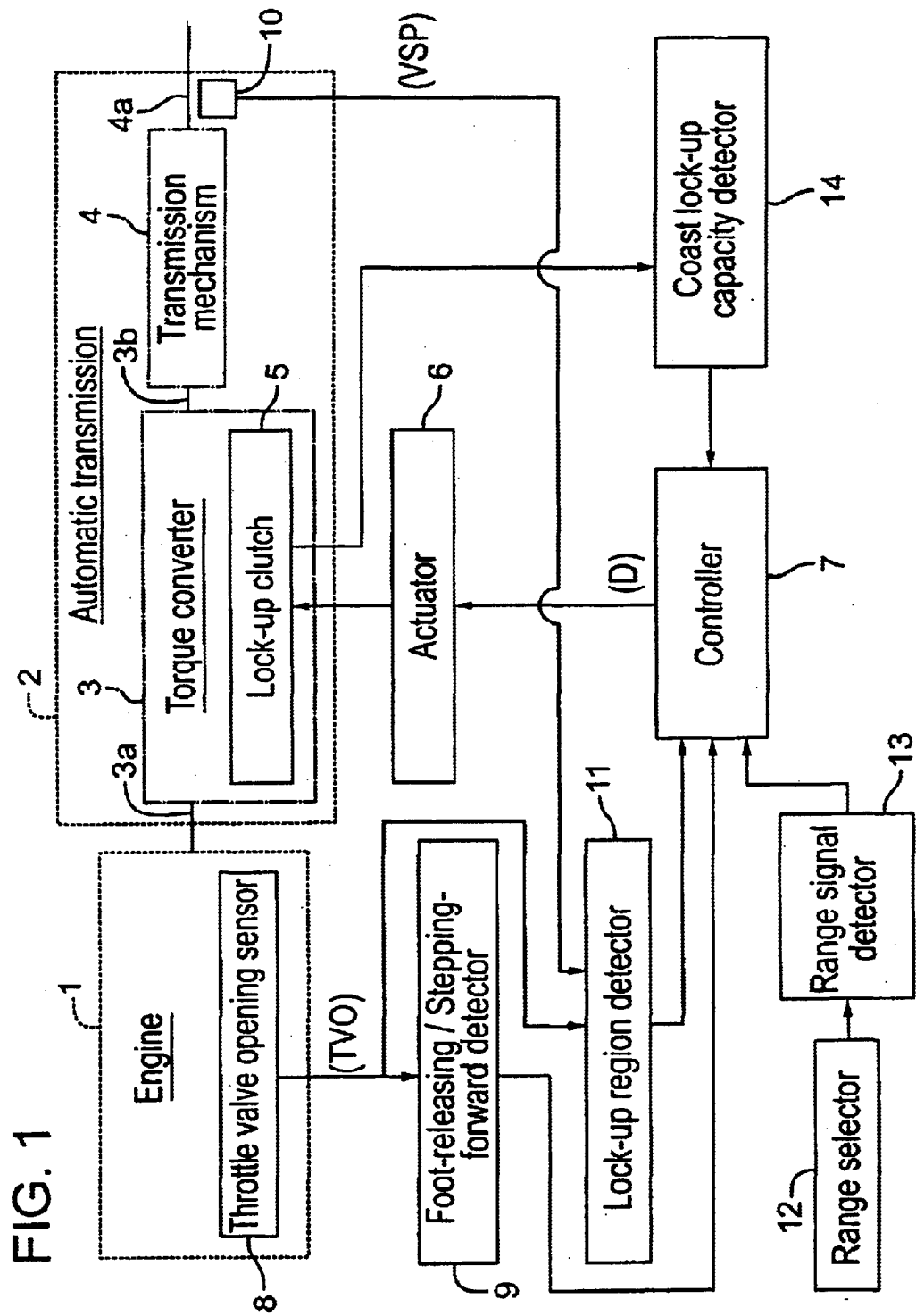
FIG. 1 is a diagram showing a vehicle power train provided with a lock-up control system for a torque converter according to the present invention.

In FIG. 1, reference numeral 1 designates an engine, and reference numeral 2 designates an automatic transmission, which may be a continuously variable transmission. The automatic transmission 2 comprises a torque converter 3 (having an input 3a and an output 3b) and a transmission mechanism 4 coupled thereto in tandem, so that the rotation of the engine 1 is inputted, or transmitted, to the transmission mechanism 4 via the torque converter 3, and outputted from the transmission mechanism 4 at transmission output 4a. Although the torque converter 3 basically transmits power, or conducts power transmission, between its input 3a and output 3b elements via an interior operating fluid, the torque converter 3 can be brought into a lock-up state for directly coupling the input and output elements by appropriately engaging a lock-up clutch 5.

The lock-up clutch 5 responds to a differential pressure $P_A$-$P_R$ between an apply pressure $P_A$ and a release pressure $P_R$ on opposite sides of the lock-up clutch 5, respectively. When the release pressure $P_R$ is higher than the apply pressure $P_A$, the lock-up clutch 5 is disengaged such that there is no direct coupling between the input and output elements of the torque converter. When the release pressure $P_R$ is lower than the apply pressure $P_A$, the lock-up clutch 5 is engaged to thereby directly couple the input and output elements of the torque converter. Upon the latter engagement, it is assumed that the engaging capacity of the lock-up clutch 5, i.e., the lock-up capacity, is determined by the differential pressure $P_A$-$P_R$ such that the engaging capacity of the lock-up clutch 5 is increased as the differential pressure is increased.

Figure 2:
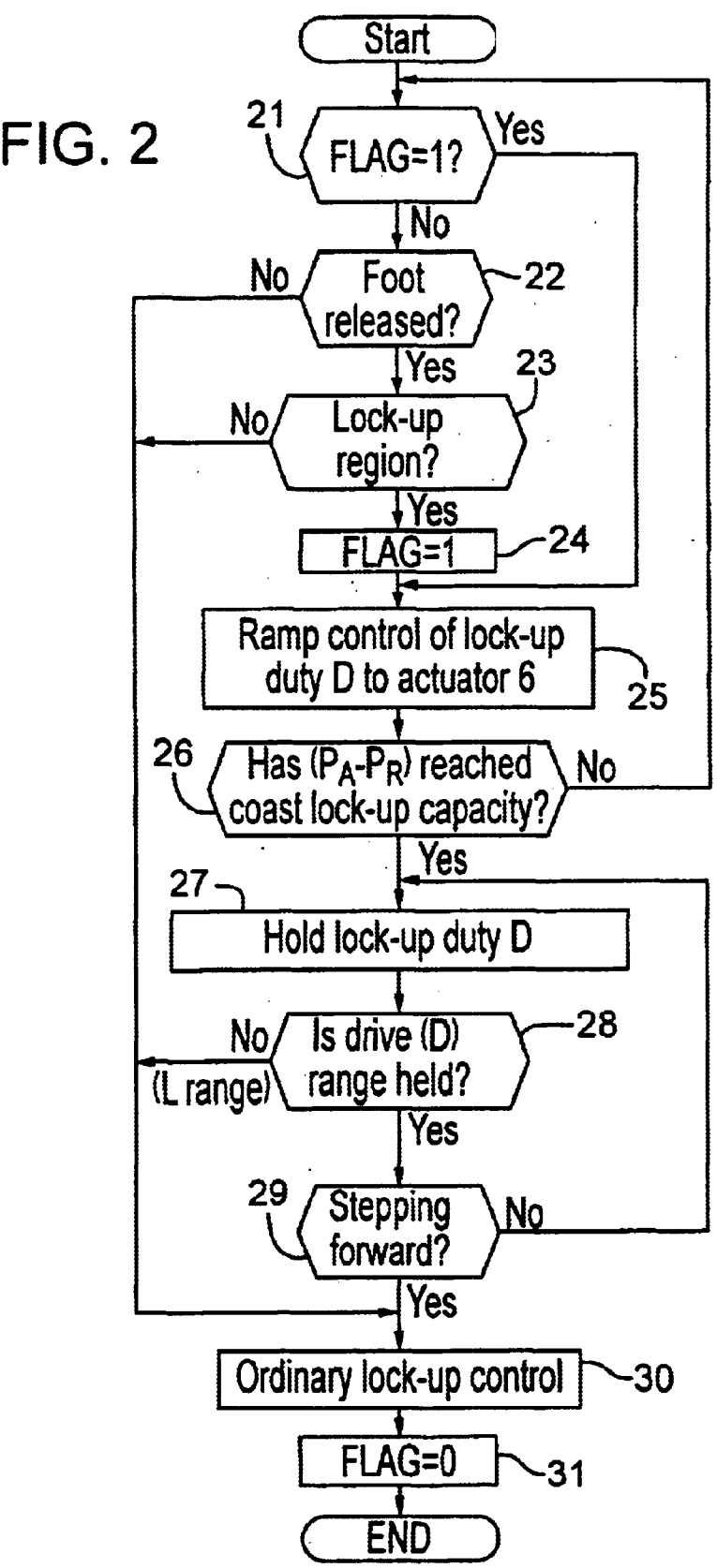
FIG. 2 is a flowchart showing a lock-up control program executed by a controller shown in FIG. 1.

The differential pressure $P_A$-$P_R$ is subjected to a duty control via an actuator 6 comprising a lock-up solenoid and a lock-up control valve, while the driving duty D of the actuator 6 is determined by a controller 7 by executing a control program shown in FIG. 2. Thus, the controller 7 receives input signals provided by a detecting result from a foot-releasing/stepping-forward detector 9 for detecting a foot-releasing state where the foot is released from an accelerator pedal or a stepping-forward state where the accelerator pedal is stepped, or pressed, forward, based on a signal from a throttle valve opening sensor 8 for detecting a throttle valve opening (TVO) of the engine 1.

The controller 7 further receives input signals provided by a detecting result from a lock-up region detector 11 for judging whether the driving condition is in a lock-up region where the torque converter 3 is to be brought into a lock-up state or in other converter regions where the torque converter 3 is not to be locked up, based on a scheduled map while taking account of the signal from a vehicle speed sensor 10 for detecting the vehicle speed (VSP) and also taking account of the throttle valve opening (TVO) detected by the throttle valve opening sensor 8.

The controller 7 additionally receives input signals from a range signal detector 13 for detecting which range is selected by a range selector 12, such as a manual lever to be manually operated by a driver upon a range selection of the automatic transmission 2, as well as a signal from a coast lock-up capacity detector 14 for monitoring a slipping state of the lock-up clutch 5 in the manner described in U.S. Pat. No. 5,935,043, the disclosure of which is herein incorporated by reference, so as to obtain the required minimum engaging capacity of the lock-up clutch 5 for locking up the torque converter 3 during a steady coasting, i.e., the coast lock-up capacity.

The controller 7 executes the control program of FIG. 2 based on the above-mentioned input information, and conducts the duty control for the actuator 6, i.e., the lock-up control for the torque converter 3, in the manner to be more fully described below.

First of all, based on whether a flag FLAG=1 or not at step 21, it is judged whether there has been a transition to a lock-up region or not, associated with the foot separation where the foot has been released last time. If it is judged that FLAG=0, i.e., or that there has been no transition to a lock-up region associated with the foot separation last time, it is newly judged at steps 22, 23 whether the lock-up region has been entered or not associated with the foot separation. More specifically, if it is judged, at step 22 corresponding to the foot-releasing/stepping-forward detector 9 in FIG. 1, that the throttle valve opening TVO is zero, and it is further judged, at step 23 corresponding to the lock-up region detector 11 in FIG. 1, that it is the lock-up region based on the throttle valve opening TVO and vehicle speed VSP, it is judged that the lock-up region has been entered associated with the foot separation, and the control is advanced to step 24 where the flag FLAG is set to "1" to indicate the judgment, thereby contributing to the judgment at step 21.

Until the above-mentioned judgment of entry into the lock-up region associated with the foot separation, the control is advanced to step 30 so as to conduct an ordinary lock-up control by the duty control for the actuator 6, and the flag FLAG is continuously reset to "0" at step 31.

Upon judgment of entry into the lock-up region at steps 22, 23 associated with the foot separation, the flag FLAG is set to "1" at step 24 in the manner described above, so as to indicate this fact. Then, at step 25, a ramp control is conducted for gradually increasing the lock-up duty D for the actuator 6 so as to proceed the engagement of the lock-up clutch 5 at a predetermined time gradient which is as steep as possible to the extent that no noticeable shock occurs. Next, at step 26, it is judged from the lock-up duty D, whether the differential pressure $P_A$-$P_R$ (engaging capacity of the lock-up clutch 5) between the apply pressure $P_A$ and the release pressure $P_R$ has reached the required minimum coast lock-up capacity obtained by the detector 14 in FIG. 1. Until the coast lock-up capacity is reached, the control is returned to step 21 to keep on executing step 25, thereby continuing the ramp control. Incidentally, the engaging capacity of the lock-up clutch during coasting in the lock-up region is brought to a coast lockup capacity that is smaller than a lock-up capacity under a driving condition at the same vehicle speed in the lock-up region, wherein the accelerator pedal is stepped forward and a non-engine-braking range is selected. The lock-up capacity under such a driving condition is determined by an engaging capacity control of the lock-up clutch at step 30, which will be explained hereinafter.

When the coast lock-up capacity is reached, a control is executed at step 27 for holding the lock-up duty D at that moment. This duty holding is continued, insofar as it is judged at step 28 that the detector 13 of FIG. 1 is detecting the holding of the D range and it is further judged at step 29 that the detector 9 of FIG. 1 is detecting the releasing of the accelerator pedal. The lock-up of the torque converter 3 during coasting in the D range is thus continuously executed based on the required minimum coast lock-up capacity obtained at the detector 14 of FIG. 1, such that the lock-up is conducted at a capacity smaller than the controlling maximum value. As a result, the response to the lock-up releasing is correspondingly quickened, to thereby avoid occurrence of an engine stall problem even upon wheel locking due to a sudden braking.

While such a lock-up control is conducted during coasting in the D range, when engine braking is desired and the driver conducts a range changeover from the D range to the L range, the step 28 advances the control to steps 30, 31 to thereby changeover to the ordinary lock-up control. Thus, as can be appreciated from FIG. 3 showing an operation time-chart of the lock-up control according to the present invention, under the same condition as FIG. 4, the lock-up of the torque converter 3 during coasting in the L range is conducted in a state where the lock-up clutch engaging capacity ($P_A$-$P_R$) is brought to the controlling maximum value as indicated by the solid line.

Figure 3:
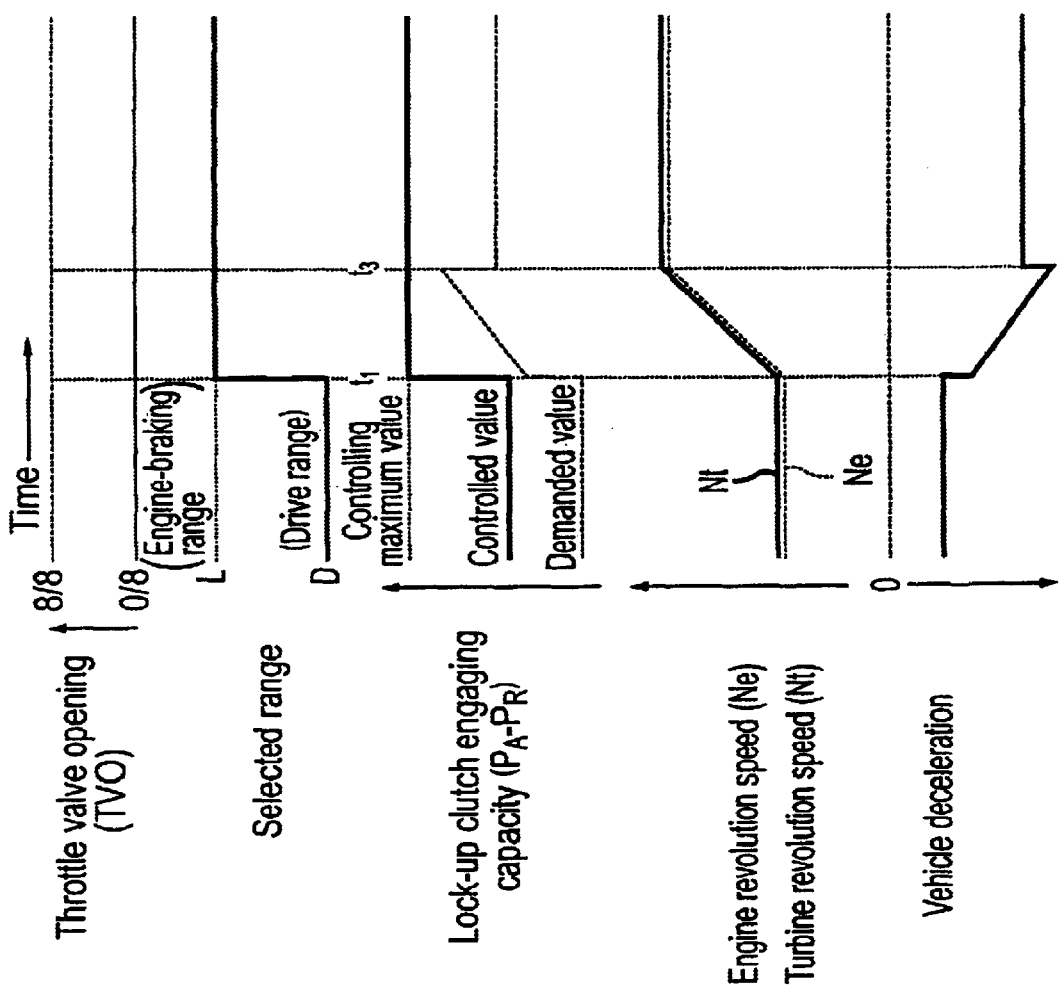
FIG. 3 is an operation time-chart showing a coast lock-up of the lock-up control according to the present invention, in case of changeover from a non-engine-braking range to an engine-braking range.
Figure 4:
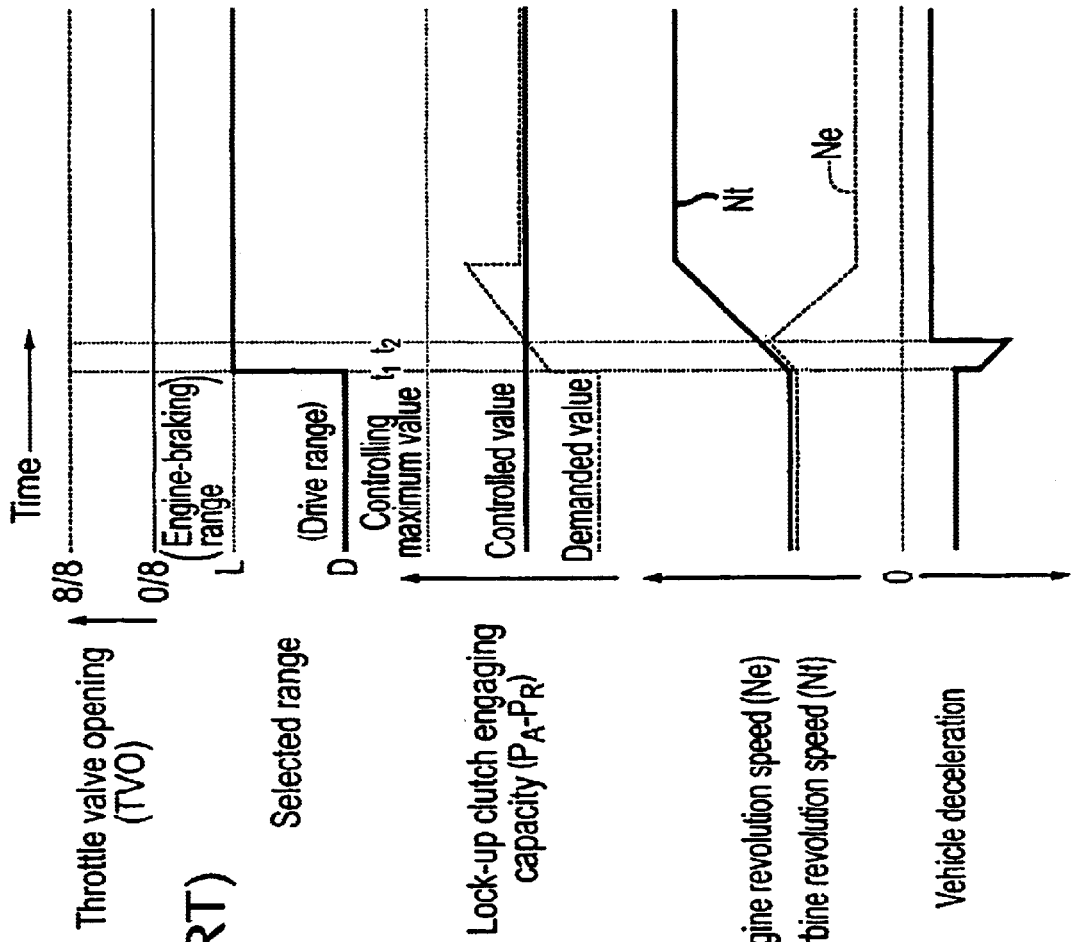
FIG. 4 is an operation time-chart showing a conventional coast lock-up under the same condition as FIG. 3.

It can be also appreciated from FIG. 3 that, upon the range changeover during coasting, the demanded value of the lock-up clutch engaging capacity is raised as indicated by a broken line in FIG. 3, which is obtained from the broken line in FIG. 4, and reaches its peak at a moment t3. Since, however, the controlled value for the lock-up clutch engaging capacity ($P_A$-$P_R$) is still larger than the demanded value even at the peak moment t3, the lock-up clutch engaging capacity is always maintained at a sufficient level for the demanded value, thereby allowing it to keep the engaging state of the lock-up clutch. Thus, as apparent from the situation where the engine revolution speed $N_e$ indicated by a broken line in FIG. 3 is changed integrally with the turbine revolution speed $N_t$ (torque converter output revolution speed) without deviating therefrom, and as apparent from the fact that the vehicle deceleration is changed in the manner shown in FIG. 3 without being accompanied by the temporal transition shown in FIG. 4, it is possible to obtain an expected magnitude of engine braking by changing over from the D range to the L range.

With the coast lock-up control according to the embodiment explained above, when engine braking is desired during coasting and a changeover is effected from the D range, having an ineffective engine braking, to the L range as the engine-braking range, it is possible to avoid such problems that the lock-up is released even in the lock-up region with the result that the intended effect of improving fuel efficiency is not fully achieved, and/or unnatural driving feel is caused due to unexpectedly low, or occasionally decreasing engine braking force upon the change-over even though an engine braking range has been selected.

Also, when it is decided that the detector 9 of FIG. 1 has detected the stepping forward of the accelerator pedal at step 29, the control is advanced to step 30 so as to execute the ordinary lock-up control. As a result, the lock-up duty D is raised to the highest value to thereby completely engage the lock-up clutch 5 if still in the lock-up region, and the flag FLAG is reset to "0" at the next step 31.

While the present invention has been described above with reference to a specific embodiment shown in the accompanying drawings, it has been presented for illustrative purpose only, and various changes or modifications may be made without departing from the scope of the invention as defined by the appended claims.

What is claimed is:

1. A lock-up control system for a torque converter including a lock-up clutch engageable under control of an engaging capacity of the lock-up clutch to thereby lock up input and output elements of the torque converter;

said control system being operative during coasting in a lock-up region requiring an engagement of the lock-up clutch for bringing the engaging capacity of the lock-up clutch to a coast lockup capacity smaller than a lock-up capacity under a driving condition at the same vehicle speed;

said control system being further operative when an engine braking range is selected during coasting in the lock-up region, for bringing the engaging capacity of the lock-up clutch to a value greater than the coast lock-up capacity.

2. A lock-up control system according to claim 1, wherein said control system during a coasting in a lock-up region brings the engaging capacity of the lock-up clutch to a minimum coast lock-up capacity required for the lock-up under a driving condition at the same vehicle speed.

3. A lock-up control system according to claim 1, wherein said control system upon selection of the engine braking range during coasting in the lock-up region brings the engaging capacity of the lock-up clutch to a controlling maximum value.

4. A lock-up control system for a torque converter of an automatic transmission, including a lock-up clutch engageable under control of an engaging capacity of the lock-up clutch to thereby lock up input and output elements of the torque converter, said automatic transmission including a range changeover means for effecting changeover between a non-engine-braking range and at least one engine-braking range, said lock-up control system comprising:

a lock-up clutch control means being operative during coasting in a lock-up region requiring engagement of the lock-up clutch, for bringing the engaging capacity of the lock-up clutch to a coast lockup capacity smaller than a lock-up capacity under a driving condition at the same vehicle speed;

said lock-up control means being further operative when it is judged that said range changeover means is operated in the lock-up region to effect changeover into an engine braking range, for bringing the engaging capacity of the lock-up clutch to a value greater than the coast lock-up capacity.

5. A lock-up control system according to claim 4, wherein said lock-up control means during coasting in the lock-up region brings the engaging capacity of the lock-up clutch to a minimum coast lock-up capacity required for lock-up under a steady traveling condition.

6. A lock-up control system according to claim 5, further comprising a coast lock-up capacity detecting means for detecting whether the coast lock-up capacity has been achieved, based on a differential pressure across opposite sides of said lock-up clutch.

7. A lock-up control system according to claim 4, wherein said lock-up clutch control means upon selection of the engine braking range during the coasting in the lock-up region brings the engaging capacity of the lock-up clutch to a controlling maximum value.

* * * * *